(12) United States Patent
Grant et al.

(10) Patent No.: US 7,043,566 B1
(45) Date of Patent: May 9, 2006

(54) ENTITY EVENT LOGGING

(75) Inventors: Justin Grant, Seattle, WA (US); Michael S. Murstein, Kirkland, WA (US); Alexander M. Sutton, Seattle, WA (US); Michael W. Thomas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 09/686,426

(22) Filed: Oct. 11, 2000

(51) Int. Cl.
*G06F 15/173* (2006.01)

(52) U.S. Cl. .................. 709/323; 709/324; 719/318

(58) Field of Classification Search ............... 709/223, 709/224, 323, 324; 719/318; 714/4, 47, 714/48; 702/188
See application file for complete search history.

(56) References Cited

U.S. PATENT DOCUMENTS

| | | | |
|---|---|---|---|
| 5,305,454 A * | 4/1994 | Record et al. ............ 719/318 |
| 5,483,468 A | 1/1996 | Chen et al. |
| 5,581,482 A | 12/1996 | Wiedenman et al. |
| 5,602,845 A * | 2/1997 | Wahl ................ 370/395.7 |
| 5,923,874 A | 7/1999 | Koenig |
| 5,966,706 A | 10/1999 | Biliris et al. |
| 5,987,514 A * | 11/1999 | Rangarajan ............. 709/224 |
| 5,991,806 A * | 11/1999 | McHann, Jr. ............ 709/224 |
| 6,049,798 A | 4/2000 | Bishop et al. |
| 6,138,121 A * | 10/2000 | Costa et al. ............ 707/100 |
| 6,230,198 B1 * | 5/2001 | Dawson et al. .......... 709/224 |
| 6,553,403 B1 * | 4/2003 | Jarriel et al. ............ 709/202 |
| 6,594,786 B1 * | 7/2003 | Connelly et al. ......... 714/50 |
| 6,597,957 B1 * | 7/2003 | Beakley .................. 700/7 |
| 2002/0042846 A1 * | 4/2002 | Bottan et al. ........... 709/249 |
| 2003/0041107 A1 * | 2/2003 | Blattner et al. .......... 709/204 |

OTHER PUBLICATIONS

Gunter, D., et al.; "NetLogger: a toolkit for distributed system performance analysis", Proceedings of the 8th International Symposium on Modeling, Analysis and Simulation of Computer and Telecommunication Systems, Aug. 29-Sep. 1, 2000 pp.: 267-273 ☐☐.*

(Continued)

*Primary Examiner*—Frantz B. Jean
(74) *Attorney, Agent, or Firm*—Amin & Turocy, LLP

(57) ABSTRACT

A system and method for monitoring events of a plurality of members configured as an entity. Configurable event logging settings can be defined at a first member and dynamically propagated to each member of the entity to establish event logging configuration settings at each of the plurality of members. In one aspect of the invention, a system and method log different event types in accordance with configuration settings into a common event type data format at a plurality of members. The different event types can then be coalesced for the entire entity and returned to a requestor residing at a single location. Additionally, a unique identifier can be assigned to assist in monitoring of events. Also, to assist in monitoring, data that is common to all event types can be stored in a separate table from data specific to an event type.

21 Claims, 11 Drawing Sheets

OTHER PUBLICATIONS

The NetLogger Methodology for High Performance Distributed Systems Performance Analysis by Tierney et al, IEEE, Apr. 1998.*

Provan, G., et al.; "Characterizing Controllability and Observability Properties of Temporal Causal Network Modeling for Discrete event Systems", *Proceedings of the 2000 American Control Conference*. ACC, vol. 5, Jun. 2000, p. 3540-3544.

Aboelela, E., et al.; "Fuzzy Temporal Reasoning Model for Event Correlation in Network Management", *Proceedings $24^{th}$ - Conference on Local Computer Networks*. LCN'99, Oct. 1999, p. 150-159.

Tierney, B., et al.; "The NetLogger Methodology for High Performance Distributed Systems Performance Analysis", *Proceedings. The Seventh International Symposium on High Performance Distributed Computing*, Jul. 1998, p. 260-267.

* cited by examiner

ENTITY EVENT LOGGING

TECHNICAL FIELD

The present invention relates generally to computer systems, and more particularly to a system and method for monitoring and gathering event metrics of a plurality of computers cooperating as an entity wherein the entity may be interfaced collectively as a whole and/or individually. Additionally, the system and method may be employed to monitor and gather event metrics of a plurality of entities cooperating as a higher entity where a parent entity may be interfaced directly or as part of an even higher collection of parent entities. The gathering of event metrics is hierarchical with no predefined limits.

BACKGROUND OF THE INVENTION

With the advent of Internet applications, computing system requirements and demands have increased dramatically. Many businesses, for example, have made important investments relating to Internet technology to support growing electronic businesses such as E-Commerce. Since companies are relying on an ever increasing amount of network commerce to support their businesses, computing systems generally have become more complex in order to substantially ensure that servers providing network services never fail. Consequently, system reliability is an important aspect to the modern business model.

A first approach for providing powerful and reliable services may be associated with a large multiprocessor system (e.g., mainframe) for managing a server, for example. Since more than one processor may be involved within a large system, services may continue even if one of the plurality of processors fail. Unfortunately, these large systems may be extraordinarily expensive and may be available to only the largest of corporations. A second approach for providing services may involve employing a plurality of lesser expensive systems (e.g., off the shelf PC) individually configured as an array to support the desired service. Although these systems may provide a more economical hardware solution, system management and administration of individual servers is generally more complex and time consuming.

Currently, management of a plurality of servers is a time intensive and problematic endeavor. For example, managing server content (e.g., software, configuration, data files, components, etc.) requires administrators to explicitly distribute (e.g., manually and/or through custom script files) new or updated content and/or configurations (e.g., web server configuration, network settings, etc.) across the servers. If a server's content becomes corrupted, an administrator often has no automatic means of monitoring or correcting the problem. Furthermore, configuration, load-balance adjusting/load balance tool selection, and monitoring generally must be achieved via separate applications. Thus, management of the entity (e.g., plurality of computers acting collectively) as a whole generally requires individual configuration of loosely coupled servers whereby errors and time expended are increased.

Presently, there is not a straightforward and efficient system and/or process for monitoring system events of a collection of independent servers. Many problems are thereby created since administrators may be generally required to work with machines individually to monitor server state and administer each server. Due to the need to administer and modify content on each machine individually, errors are a common occurrence. It is currently not possible to receive all system wide events and/or status views of the collection of servers. Some applications may exist that provide some events or status of an individual server, however, these applications generally do not provide all events or status across the logical collection of loosely coupled servers. For example, many times it is important to view information from the collection of servers to determine relevant system-wide performance. Thus, obtaining a quick response view of pertinent event information (e.g., Operating System events, System events, Health Monitoring events) associated with the plurality of servers may be problematic, however, since each server generally must be searched independently.

Currently, there is not an efficient and straightforward interface for monitoring events of an entity without substantial and sometimes complex individual configuration/monitoring of each member associated with the entity. Consequently, there is an unsolved need in the art for an event monitoring system for monitoring a group of servers operating as an entity.

SUMMARY OF THE INVENTION

The present invention relates to a system and method of monitoring and gathering events for a plurality of entities as a single entity. For example, the entities may include a plurality of members (e.g., computers, servers, clusters) collectively cooperating as a whole. In accordance with one aspect of the present invention, a system interface is provided wherein a consistent and unified representation of event information of a plurality of the entities as a whole may be obtained from any of the members associated with the entity. The system and method provides for configuration settings to be provided on a single member wherein the configuration setting information (e.g., event information to be logged) is propagated or replicated to each member of the entity. The configuration setting information is then employed by each member for determining which event types (e.g., entity events, operating system events, monitoring events) to log. The members are notified of any changes to the configuration settings and each event monitoring system dynamically adjusts the event logging accordingly.

The present invention relates to a system and method for specifying events to be logged across a plurality of machines and for standardizing those events from different types of events into a single event type. The present invention further provides for replication of the configuration throughout a plurality of machines. The system and method employ an event monitor system that combines events from multiple sources with different schemas into a single list of events having a common schema. The monitor system analyzes data from different event types and maps the data to a common event type format. The configuration of which event types and event severity types to log and not to log can be specified at any one of the members of the entity. The configuration is then dynamically replicated to each member. Then the events are collected on each machine, mapped to a common schema, and stored. A single event result set can then be stored in a database in the common event type format.

In one aspect of the invention, an example of the present invention is provided that allows for standardizing operating system event types, entity event types and health monitor event types in a generic event type format. The event data is provided by services through an event source. In a configuration component a user can specify what events to log or not to log, which is then replicated throughout the entity. Each member of the entity then stores these events locally throughout the entity in a common data format or schema. An interface allows a user to specify what types, sources and severity types of events to be returned to a requestor as a single result set from a single member or a coalesced result set from the entity.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
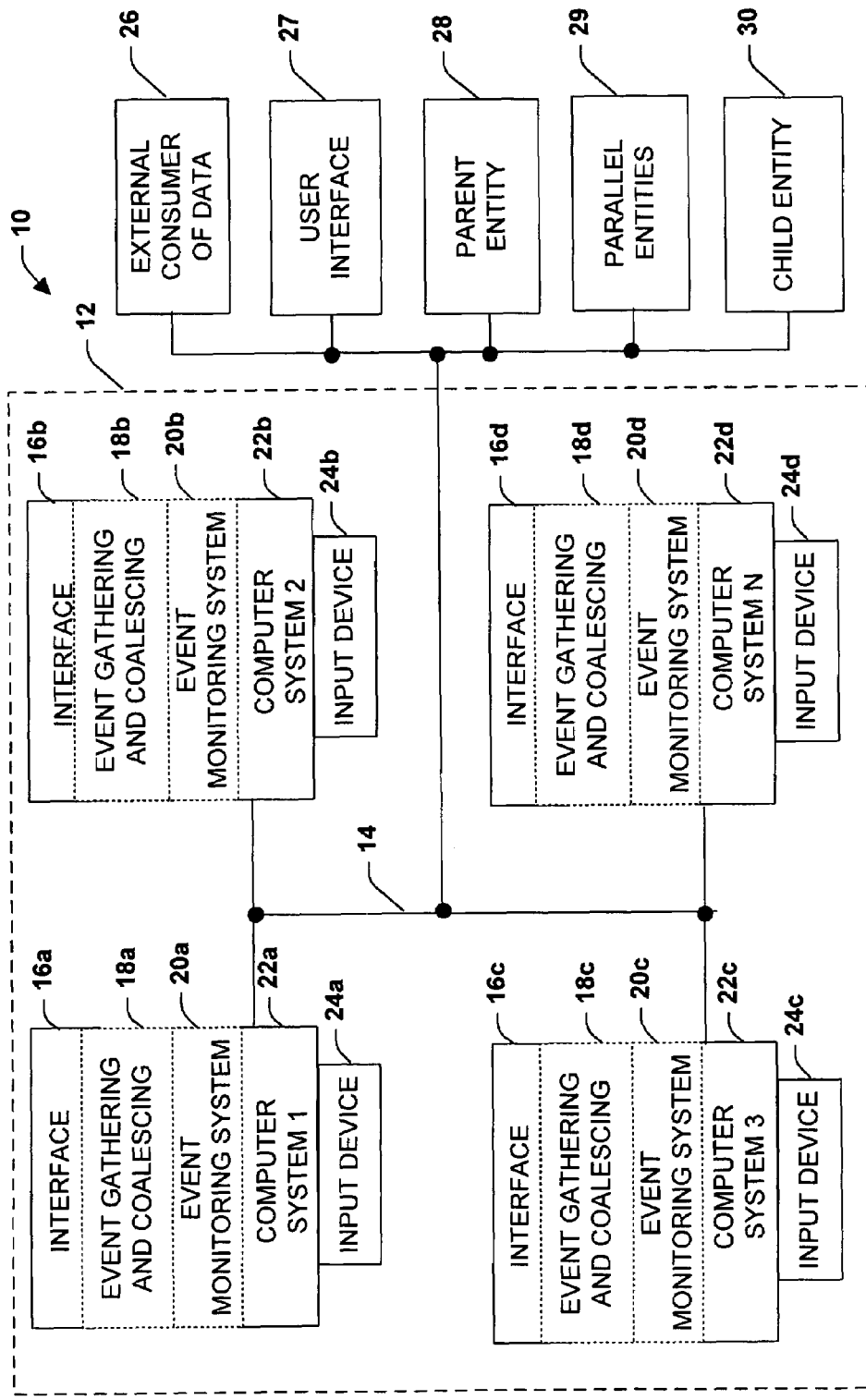
FIG. 1 illustrates a schematic block diagram illustrating an event monitoring, gathering and coalescing system of an entity in accordance with one aspect of the present invention.

The present invention is now described with reference to the drawings, wherein like reference numerals are used to refer to like elements throughout. The present invention is described with reference to a system and method for monitoring, logging and retrieving event data of a plurality of members forming an entity. The event types and the event severity types to be logged (or not to be logged) are defined at any one member of the entity and this information dynamically replicated to all members of the entity. The members then monitor these event types and severity types and logged the events locally. The data within the different event types is mapped to a common data format or schema and then logged into a data store—this allows for viewing a variety of different event data types concurrently. A requestor, for example, an interface can then request event data from the members via a event gathering and coalescing system. The event gathering and coalescing system requests and receives event data from the members based on a requested event type. The request can be either for events of a single member or for events of all members of the entity. The event gathering and coalescing system will then coalesce and format event data into a single result set, for example, over time. A subset or specified number of the single result set of coalesced and formatted event data is then communicated to the requestor or interface. Additional coalesced and formatted event data can be requested by the requestor or interface by providing the event gathering and coalescing system with a command and an event Id of the first or last event in the returned subset of results.

In accordance with the present invention, an event monitoring system is provided that greatly facilitates management and administration of an entity. The event monitoring system interface substantially automates event monitoring by enabling an application to monitor the events of the entity from any of a plurality of systems operatively coupled to the entity. A consistent interface is therefore provided wherein the entity may be monitored as if the entity were a singular machine—thereby providing a substantial improvement over conventional systems that may require an administrator to individually monitor each machine comprising the entity. Thus, the present invention saves time and administration costs associated with conventional systems. Moreover, system troubleshooting is improved since entity members may be monitored upon as a collective whole (e.g., retrieving system wide events) and/or individual members may be identified and operated upon.

Referring initially to FIG. 1, a system 10 illustrates a particular aspect of the present invention related to an event system for monitoring, gathering and coalescing event metrics of a plurality of systems cooperating as an entity. A plurality of systems (e.g., computers, servers, machines) for example, computer systems 1 through N (N being an integer) 22a through 22d may be operatively coupled to a network 14 thereby forming an entity 12. Other sources that may not be part of the entity 12, may also be coupled to the network 14 for retrieving, gathering and coalescing event metric data from the entity 12 or for gathering and event raw metric data from the entity 12 by employing its own gathering and coalescing system.

For example, an external consumer of data 26 can connect to one of the computer systems 22 through the network 14 to retrieve raw or coalesced event metric data or connect to one of the interfaces 16a through 16d to retrieve raw or coalesced event metric data. Additionally, an external user interface 27 can connect to one of the computer systems 22 through the network 14 to retrieve raw or coalesced event metric data or connect to one of the interfaces 16a through 16d to retrieve raw or coalesced event metric data. Furthermore, a parent entity 28, parallel entities 29 and/or a child entity 30 can connect to any member of the entity for retrieving and passing event metric data between entities for gathering and/or coalescing. In order to request and provide specific gathered and coalesced operation event information of the entity 12, a plurality of interfaces (e.g., computer monitor) 16a through 16d may provide output, and an input device (e.g., mouse, keyboard) 24a through 24d may provide input requests to the event gathering and coalescing system 18a through 18d.

As depicted by the system 10, the interface 16 enables an application or process to retrieve, display or monitor the entity 12 from each member 22a–22d and/or from non-members such as any of the components 26–30. The interface 16 provides a consistent interface for an application or process to retrieve the operational event metrics of the entity 12 as if it was a singular machine. Consequently, the user does not have to administer (e.g., gain access to each machine) and configure (e.g., change settings) each machine individually. Thus, time is saved and errors are mitigated. It is noted that the interface 16 generally does not have to run on each computer in the system 10. As will be described in more detail below, full entity operation monitoring may be achieved by interfacing to a single member, for example.

The interface 16 may be served with information provided from each member 22a through 22d employing any of the event gathering and coalescing systems 18a through 18d. This may be achieved by enabling each member to distribute information to the entity 12. Therefore, the interface 16 may provide coalesced event information of the entity as a whole through the event gathering and coalescing system 18—in contrast to conventional systems wherein event information of a member may be received or displayed only at the individual member or part of the information stored external to the entity. For example, computer systems 22a–22d memory failures may be retrieved and/or displayed as a coalesced result set of each member of the entity 12. Any of the interfaces 16a through 16d may be provided with a similar consistent result set. It is noted that the members 22a through 22d may also be entities. For example, some members could also be a collection of members represented by an entity. Thus, the entity 12 may include members that are entities in their own right.

Alternatively, the interface 16 is provided with individual event metrics from any of the event gathering and coalescing systems 18a through 18d by requesting this information from that particular member. Furthermore, entity configurations may be modified from any of the interfaces 16 by enabling the user to provide input to the interface and thereby distribute resultant modifications throughout the entity 12. This may be achieved for example, by providing the input to a single member wherein the single member may then distribute the modified configuration throughout the entity 12. It is to be appreciated that other distribution systems may be provided. For example, rather than have entity operation information centrally distributed and aggregated at the single member, individual members 22a–22d may share a master file (e.g., XML) describing the configuration information of each member.

Figure 2:
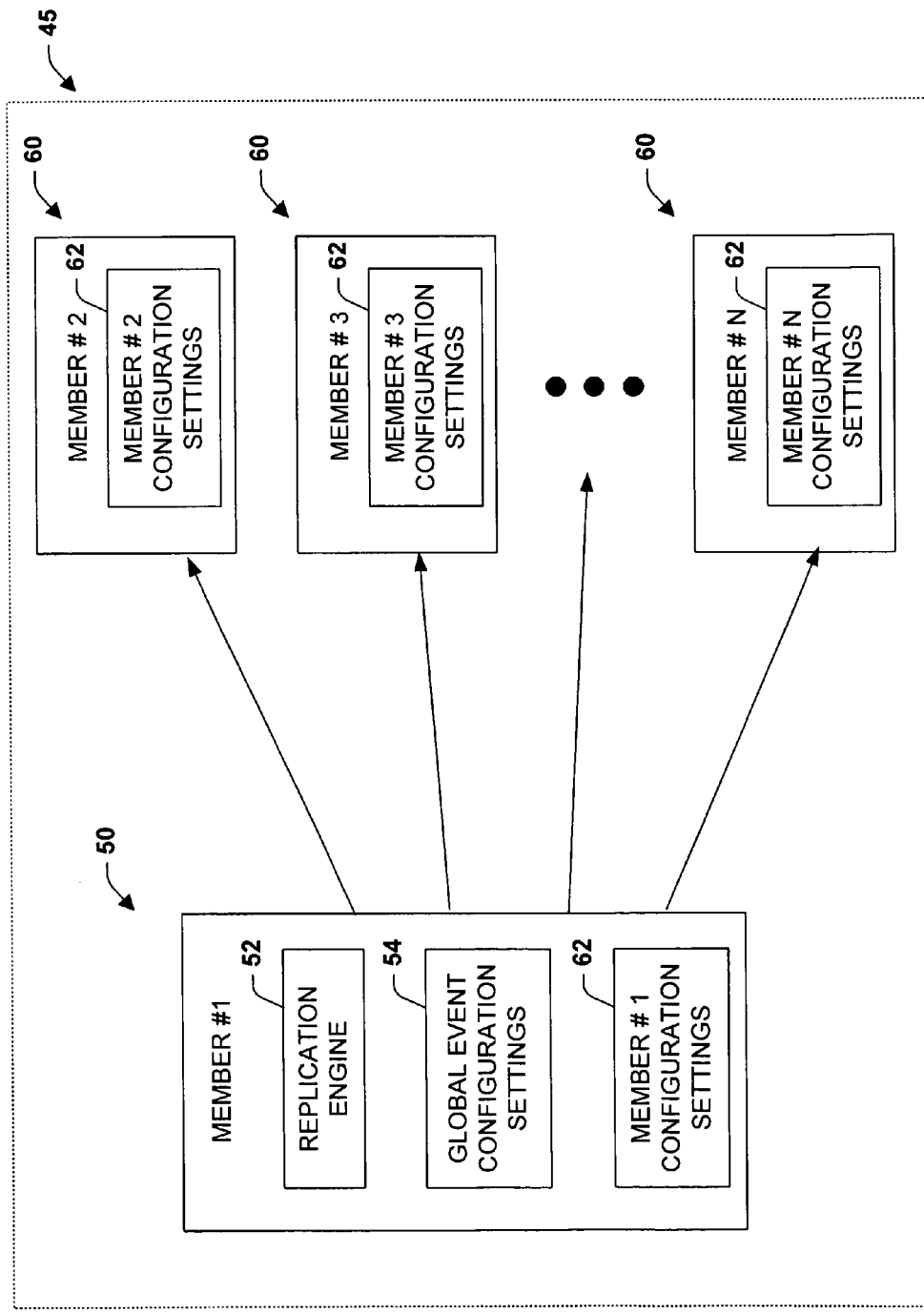
FIG. 2 is a schematic block diagram illustrating replication of event configuration settings of an entity in accordance with one aspect of the present invention.

FIG. 2 illustrates entity configuration with respect to configuration of the types of events that are to be monitored by members of the entity, so that there is uniformity throughout the entity of the types of events to be monitored. This uniformity allows for similar event information to be monitored and displayed for not only individual members, but also for the entity as a whole. An entity 45 is provided having a first member 50 and a plurality of additional members 60 coupled to the first member 50. The first member 50 includes a global event configurations settings component 52 and each of the plurality of members 60 and first member 50 include member specific configurations settings 62. Setting of the event severity types (e.g., Errors and Warnings, Errors Only, Warnings Only, Information Only) for the event types (e.g., Entity events, Operating System events, Health Monitor events) to be logged in addition to the event types not to be logged in the global event configurations settings 54 on the controller 50 provides for propagation of these settings to the configuration settings 62 of the members 60 in addition to the first member 50. This is accomplished by employing a replication engine 52. This provides for logging of the same event severity types and the same event types for each member of the entity 45. Any change to the global performance configuration settings 54 causes the member configuration settings 62 to be dynamically updated. It is to be appreciated that the global event configuration settings may be set at any of the plurality of members of the entity and the settings propagated to each member.

Figure 3:
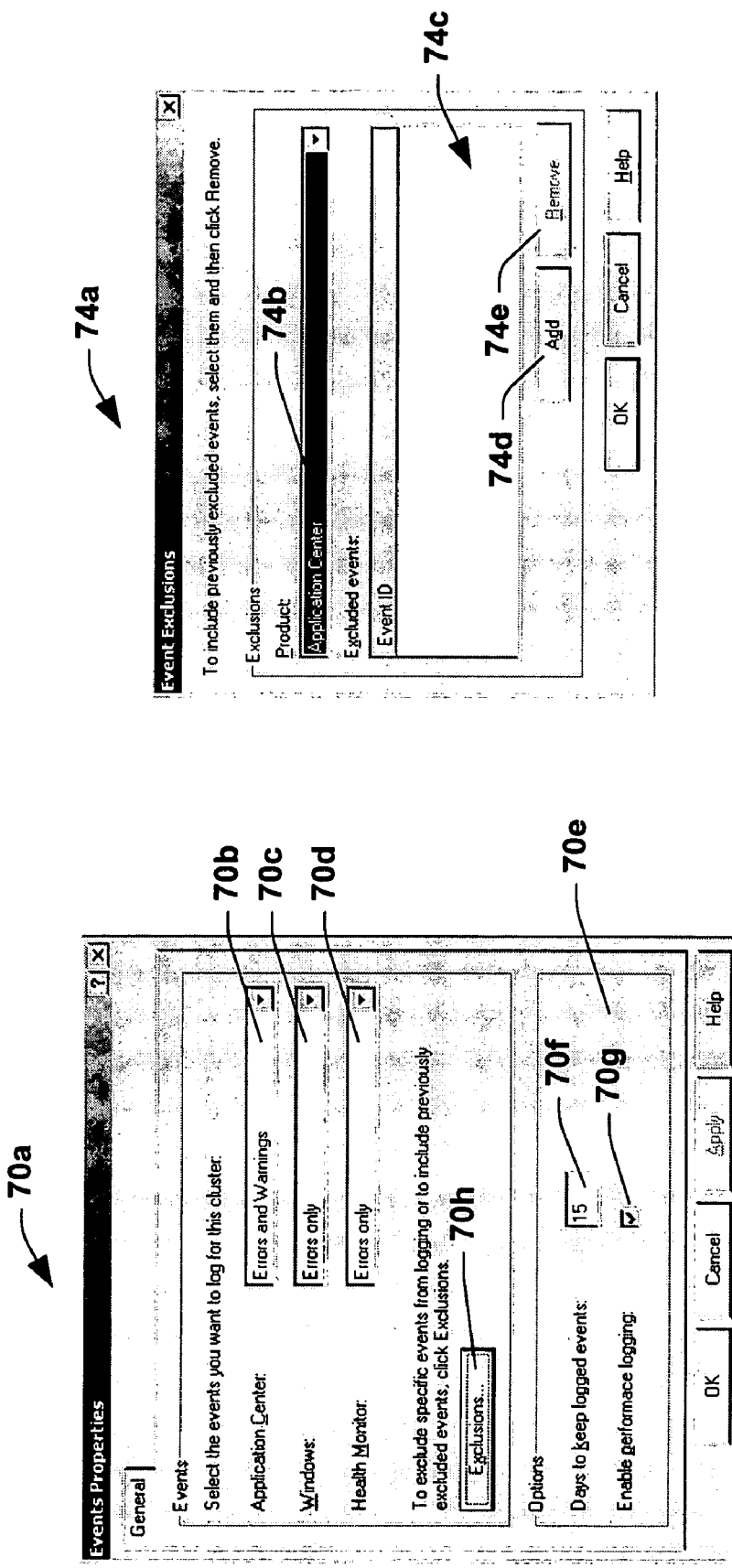
FIGS. 3a and 3b illustrate configuration interface displays for configuring events in accordance with one aspect of the present invention.

Referring now to FIG. 3a, an events property interface 70a illustrates another configuration aspect in accordance with the present invention. The interface 70a enables the user to select the types of events to log, from which log to record an event, and for how long to store the logged events. Logs may include inputs for selecting: entity operations 70b (e.g., Application Center), operating systems events 70c (e.g., Windows/UNIX system events) and/or monitor events 70d. The user may then define and/or limit the event types by entering and/or selecting event types in the selection fields for a particular log 70b, 70c and 70d (e.g., Errors Only, Warnings Only, Errors and Warnings, etc.). An options interface 70e may also be included to enable the user to determine aspects to employing event logs. For example, how long to store the event logs may be defined by an input 70f. An exclusions input 70h may be provided to enable a user to exclude specific events from logging and/or to re-enable previously excluded events. If the user selects the exclusions input 70h, an exclusions dialog 74a illustrated in FIG. 3b may then be invoked. The exclusions dialog 74a enables users to define, at a more granular level, events to exclude from being logged. For example, a product input 74b enables a user to define from which portion of the entity to exclude the requested event (e.g., Application Center, Windows, monitor). An event id input 74c may be provided to enable the user to define the associated event. For example, if the user were to enter number 1000, a Windows application event may be defined. Add and Remove inputs 74d and 74e respectively may be provided to add and remove events respectively.

Figure 4:
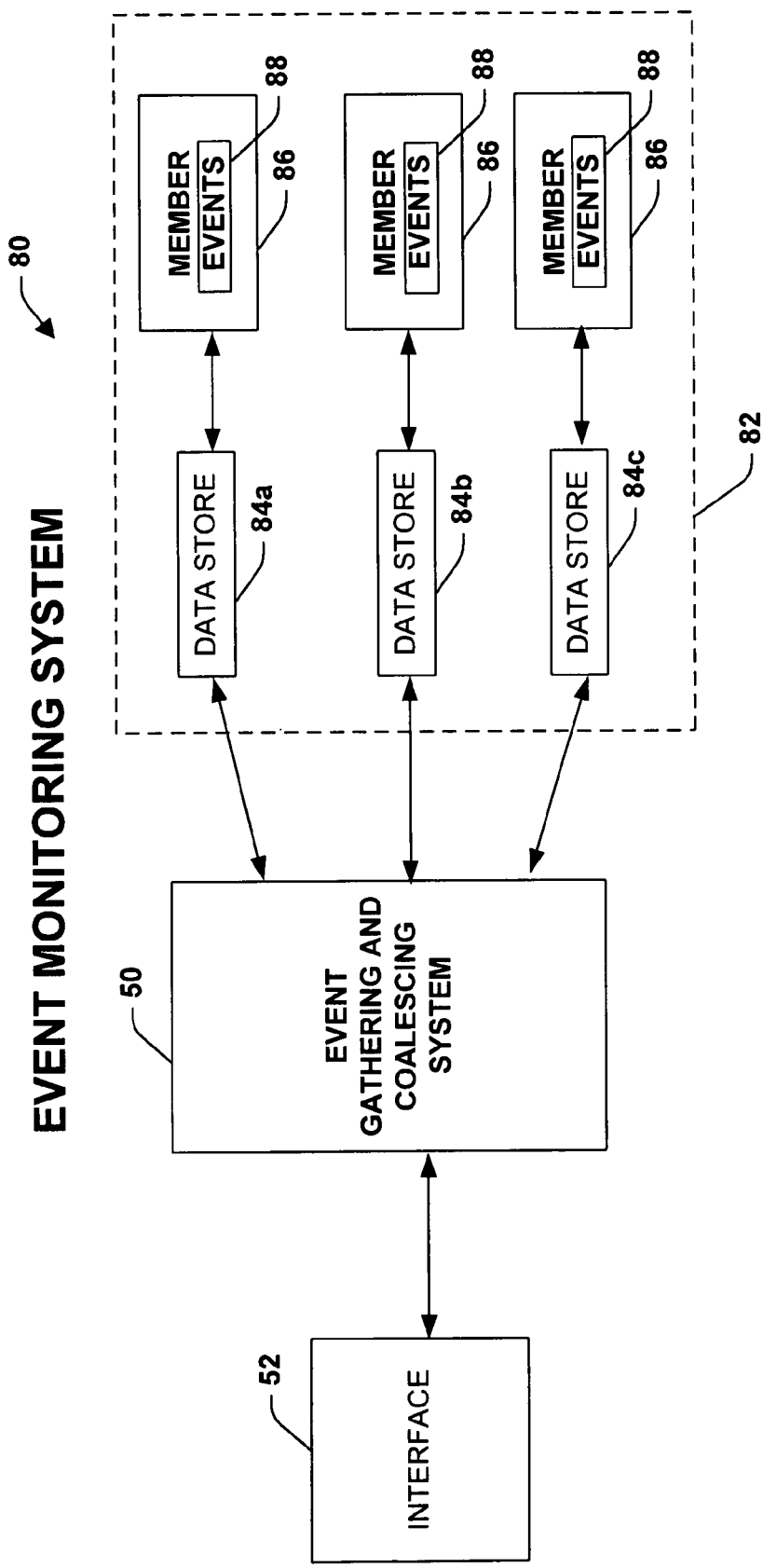
FIG. 4 is a schematic block diagram illustrating an event and failure management system in accordance with an aspect of the present invention.

As illustrated in FIG. 4, event and failure management may be enabled by generating events 88 for the members 86, logging the events, and monitoring the events either from an entity 82 and/or from a member 86. Events are generally data points reflecting member 86 activity and may be logged into data stores 84a–84c for each member. The event gathering and coalescing system 50 may then query the data stores 84, and coalesce the information into a single event result set.

As an example of coalescing, the event gathering and coalescing system 50 may acquire events from the data stores 84 (e.g., operating system events, entity events, health monitor events) and coalesce these events into a single result set and thus provide a coalesced result set of all events of the entity to an interface 52. Thus, entity administration and troubleshooting is improved over conventional systems by enabling users to administer and monitor entity events as opposed to individual member events. It is to be appreciated that events 88 may also be characterized as general purpose interrupts that may be triggered at the occurrence of a predetermined condition. Thus, it is understood that a UNIX and/or other operating system may be similarly configured, for example.

Figure 5:
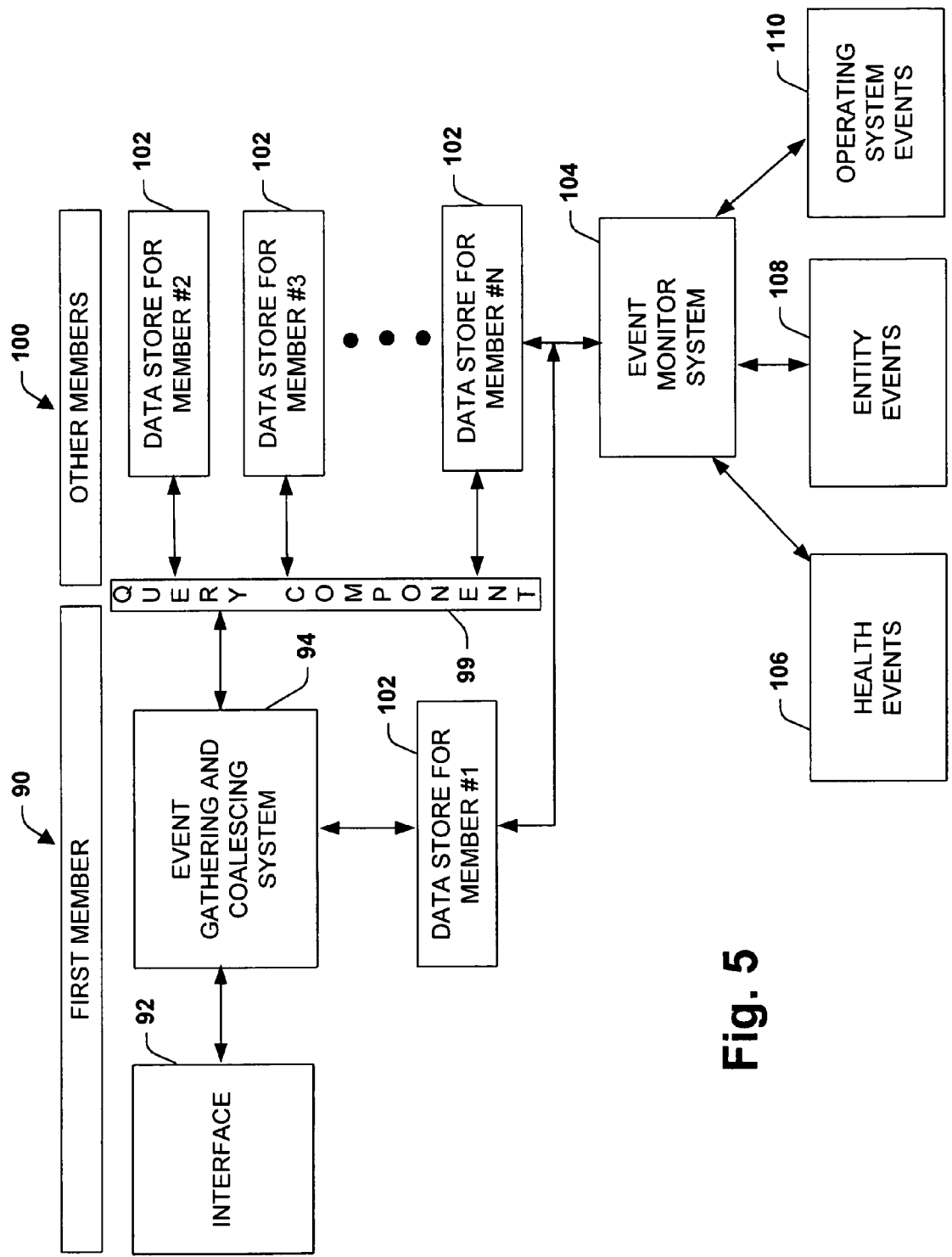
FIG. 5 is a schematic block diagram illustrating event monitoring of an entity in accordance with one aspect of the present invention.

FIG. 5 illustrates a block schematic view of the components employed to provide both a singular member result set of event information and a coalesced entity result set of event information utilizing the event monitoring system of the present invention. A first member 90 and the other members 100 each include an event monitor system 104 that receives various types of local events such as member health events 106, entity events 108 and member operating system events 110. The event monitor system 104 receives events based on event severity types and event types to log defined in by a local configuration setting. The event monitor system 104 then maps different event types into a common data format or schema, so that an interface 92 or other source can retrieve the events in a common format from data stores 102 of each member via an event gathering and coalescing system 94. It is to be appreciated that component(s) may reside between the event monitor system 104 and the data store 102 for setting up communication links, accessing data and/or transforming data.

The first member 90 includes the interface 92 and the event gathering and coalescing system 94. The interface 92 can provide a request to the event gathering and coalescing system 94 for event data based on a single member view or based on an aggregated view of the events over the entire entity. The event gathering and coalescing system 94 sends a request to a query component 99. The query component 99 then requests information from the data stores 92. A unique event id is uses to build messages for requesting and passing event information between the event gathering and coalescing system 94 and the query component 99. It is to be appreciated that component(s) may reside between the event gathering and coalescing system and the query component 99 for setting up communication links, accessing data and/or transforming data. The event data is provided to the event gathering and coalescing system 94 for the particular event types and event severity types requested by the interface 92.

The event gathering and coalescing system 94 can gather event data from all the members including the first member and coalesces the event data into a single result set. The event gathering and coalescing system 94 then provides the interface 92 with a subset or block of events of the total result set. Each event can be uniquely identified because it is assigned a globally unique identification number (GUID) and has a unique member number (member name) and a log time. This GUID is considered a bookmark to an event. This allows the requestor of events to specify or limit the number of received events in addition to allowing the requestor to navigate within the larger result set to get more event data or to retrieve previously retrieved data.

As previously stated, a request to receive only a specified number of records at once can be made by a requestor. Additionally, a second request can be made using a GUID of a first or last event in the specified records or block of records received for a previous or subsequent subset or block of events. This allows a requestor the ability to move through the consolidated single result set. For example, the event gathering and coalescing system 94 will receive a request from a requestor (e.g., an interface or a source) to receive event information over a certain time period for either a particular member or for the entity as a whole. The event gathering and coalescing system 94 will then access or query event information relating to the time period to be received for a single member or over all members. The event gathering and coalescing system 94 will gather the event information and coalesce the information into a single event result set for a particular time period requested by the requester. The event gathering and coalescing system 94 will then return a subset or block of events to the interface 92. The interface 92 can then request previous blocks of events by providing a request for previous blocks of events and the GUID of the first event in the received block of events. Alternatively, the interface 92 can request subsequent blocks of events by providing a request for subsequent blocks of events and the GUID of the last event in the received block of events.

The GUID of an event represents a bookmark into the coalesced result set. The GUID can also be employed to retrieve details on a single event. In the present example, the interface 92 will make a query for details of a specific event and by specifying a specific event GUID and a member for which the event occurred. The event gathering and aggregation system 94 will also insert/merge strings (e.g., event templates) in the data fields that provides event details from the event instance and additional information on the event. The strings or templates include extended information about the event, such as what the event means, the severity of the event, what needs to be done, help messages and links to online support.

Figure 6A:
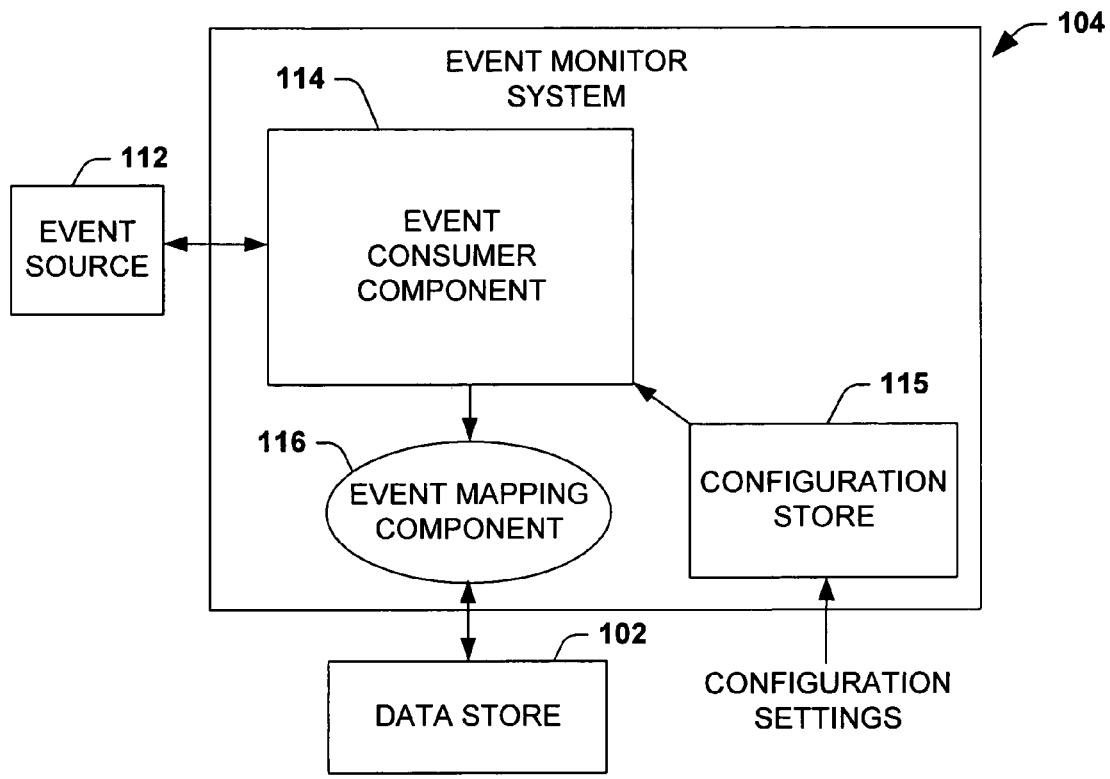
FIG. 6a is a schematic block diagram illustrating operation of an event monitor system in accordance with one aspect of the present invention.

FIG. 6a illustrates a block schematic diagram of the operation of the event monitor system 104. The event monitor system 104 includes an event consumer component 114, a configuration store component 115 and an event mapping component 116. Configuration setting information is sent to the configuration store component 115. The configuration store component 115 specifies to the event consumer component 114, which events sources of an event source component 112 to connect or subscribe. The event source component 112 could be any of a variety of event source type components based on an operating system environment or an application. For example, in the Microsoft® Windows® Operating System environment, the event source component type could be Windows Management Instrumentation (WMI), which is a support mechanism for management of systems in an enterprise. WMI allows developers to use a simple, consistent mechanism to query for information or configure settings on computers across an enterprise (e.g., hardware settings, performance information, driver configuration, BIOS information, application settings, event log information). WMI allows for both hardware and software to be configured as classes. It is to be appreciated that other computer management systems that provide configuration and performance information may be employed to carry out the present invention.

Any changes in the configuration settings received by the configuration store 115 causes a change event service to notify the event consumer component 114 that there has been a change in the configuration settings. The event consumer component 114 determines any changes, additions or deletion to the event types and event severity types being logged. The event consumer component 114 subscribes to events through the event source component 112. Once a subscribed to event is received from the event source component 112, the event monitor component 114 maps the fields for the particular event type to a common data format or data scheme into the data store 102 employing the event mapping component 116.

Figure 6B:
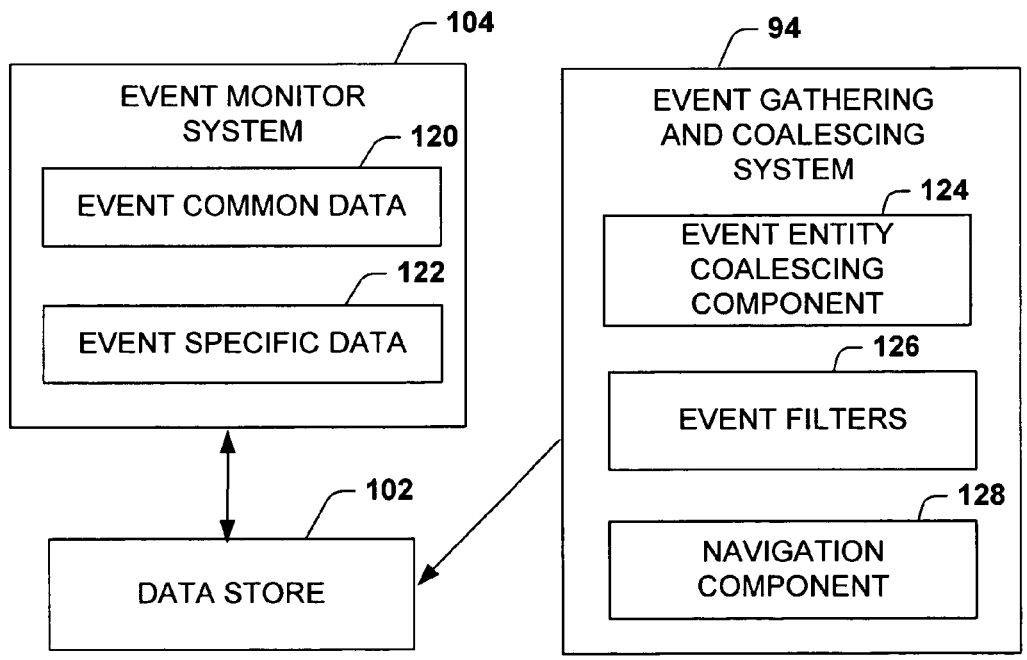
FIG. 6b is a schematic block diagram illustrating member and entity gathering and coalescing of events logged to a datastore by an event monitor system in accordance with one aspect of the present invention.

FIG. 6b illustrates a block schematic diagram of the operation of the system monitor 94 as it relates to event monitoring and coalescing of event data employing the event gathering and coalescing system 94. The event monitor system 104 logs event data having both event common data 120 and event specific data 122. Event common data 120 relates to common information for all events of that source, for example, source, event ID and event severity in addition to an event long message template to be filled in at query time employing the data in the event specific data 122. The event specific data 122 relates to data specific to each instance/occurrence of that event logged in the event common data. When returning event data to a query for details of an event, the results of the event common data and the event specific data are merged. The details of the long message template are filled with the event specific data and the event common data and the filled in long message template are returned to the requestor.

The event gathering and coalescing system 94 will receive a request from a requestor to review event information for either a particular member or for the entity as a whole. The event gathering and coalescing system 94 can then access or query event information relating to the event types and event severity types to be displayed for a single member or over the entity. The event gathering and coalescing system 94 includes an event entity coalescing component 124 adapted to coalesce event data into a single event result set. The event aggregation component 94 also includes event filters 126 for filtering out particular events specified by the requester. In addition, the event aggregation component 94 includes a navigation component 128 adapted to provide blocks or subsets of the single result set and receive requests for and provide additional blocks or subsets of the single result set.

Figure 6C:
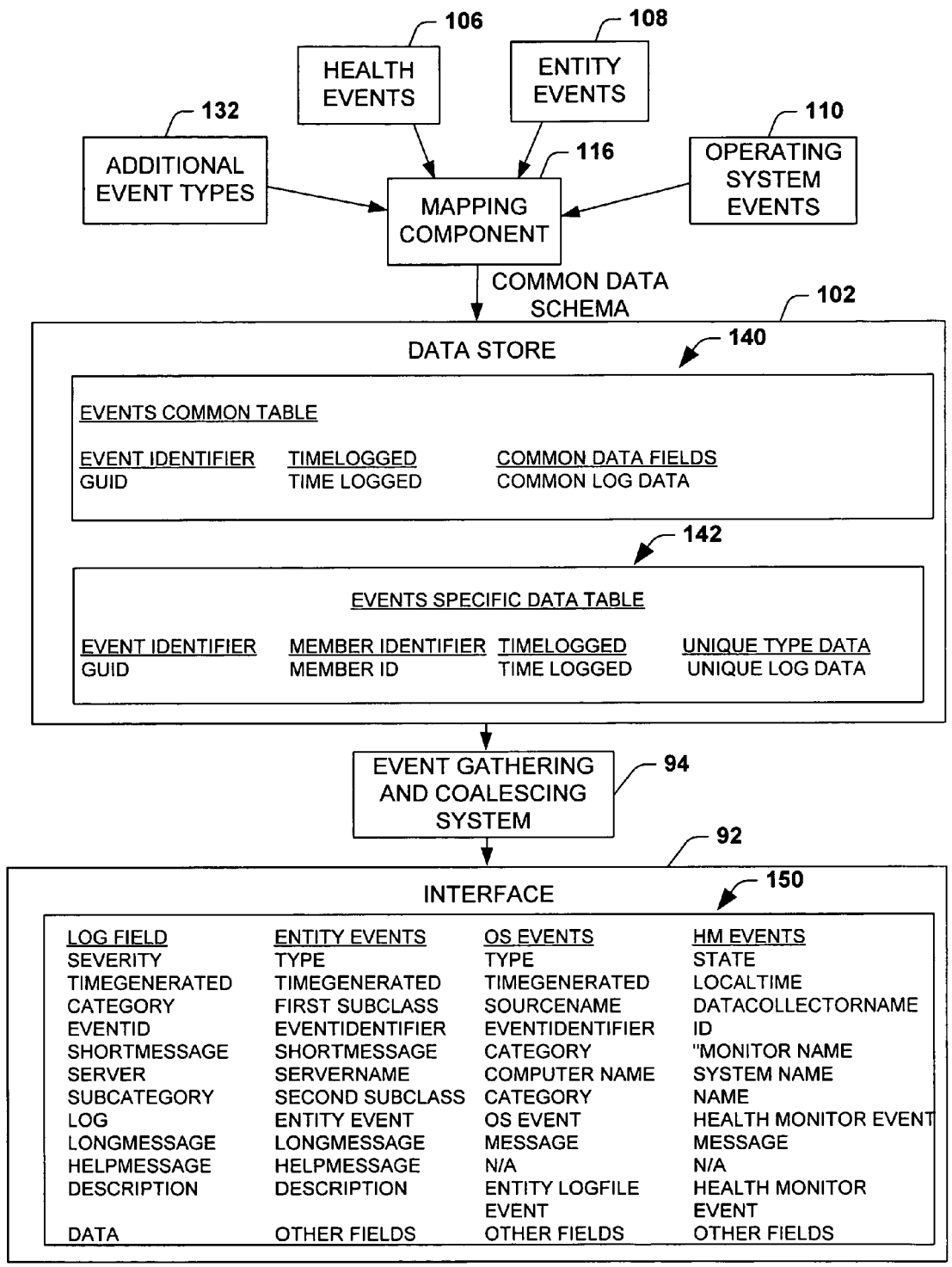
FIG. 6c is a schematic block diagram illustrating mapping of different event types into a common data format by the event monitor system in accordance with one aspect of the present invention.

FIG. 6c is a block diagram illustrating the mapping of different event types into a common format or schema and the use of the common format or schema in providing different event types by employing common log fields. The mapping component 116 maps different event types such as health events 106, entity events 108, operating system events 110 and any additional events 132 into a common data format in the data store 102. The data store 102 stores event data in an events common table 140 and an events specific table 142. The events common table 140 includes a unique event identifier for each event and the fields common to all event types. The events specific table 142 includes the unique event identifier for each member, the member identifier and the fields unique to that particular event type (e.g., a particular instance of that event). The event gathering and coalescing system 94 accesses or queries via a query component (not shown) or the like, the events common table 140 and the events specific table 142 according to requests from the interface 92. The event gathering and coalescing system 94 then coalesces the event data into a single result set and transmits the data to the interface 92. A table 150 illustrated within the interface 92 shows the common log fields for the different event types that are recieved by the interface 92 when requesting events.

Figure 7A:
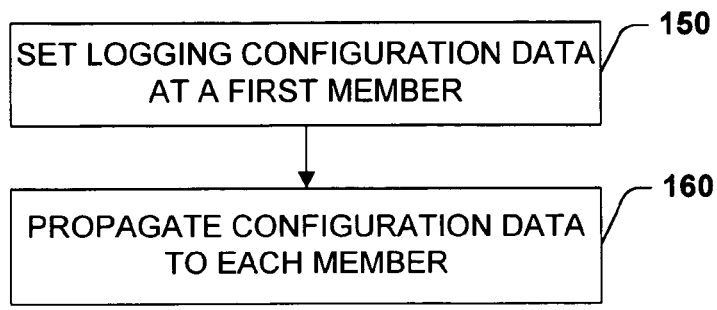
FIG. 7a is a flow diagram illustrating replication in accordance with one aspect of the present invention.
Figure 7B:
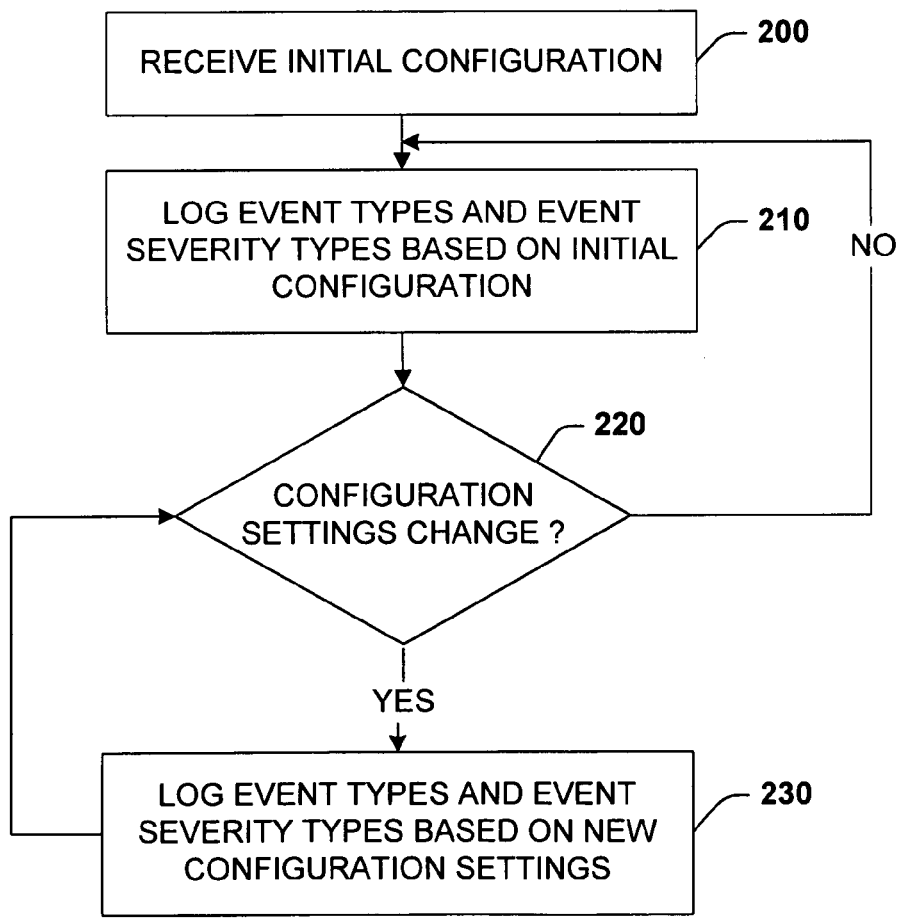
FIG. 7b is a flow diagram illustrating configuration monitoring and event logging in accordance with one aspect of the present invention.

FIG. 7a illustrates one particular methodology for providing similar configuration data settings for event types and event severity types to be logged at each member of an entity. In step 150, the global configuration settings for the events to be logged are set at the first member 50. The first member 50 then propagates these global configuration settings to the configuration settings 62 of each member including the other members 60 and the first member 50 by employing the replication engine 52 in step 160. FIG. 7b illustrates one particular methodology for each member in responding to the methodology for providing similar configuration data settings for events to be logged at each member of an entity of FIG. 7a. In step 200, the member 60 receives the initial configuration settings and begins logging event types and event severity types based on the initial configuration in step 210. In step 220, the event monitor system 104 monitors if the configuration settings have changed. If the configuration settings have not changed (NO), the event monitor system 104 continues logging events according to the initial configuration in step 210. If the configuration settings have changed (YES), the event monitor system 104 begins logging event types and event severity types according to the new configuration settings in step 230. The event monitor system 104 then returns to step 220 to determine if any new changes to the configurations settings have occurred.

Figure 8A:
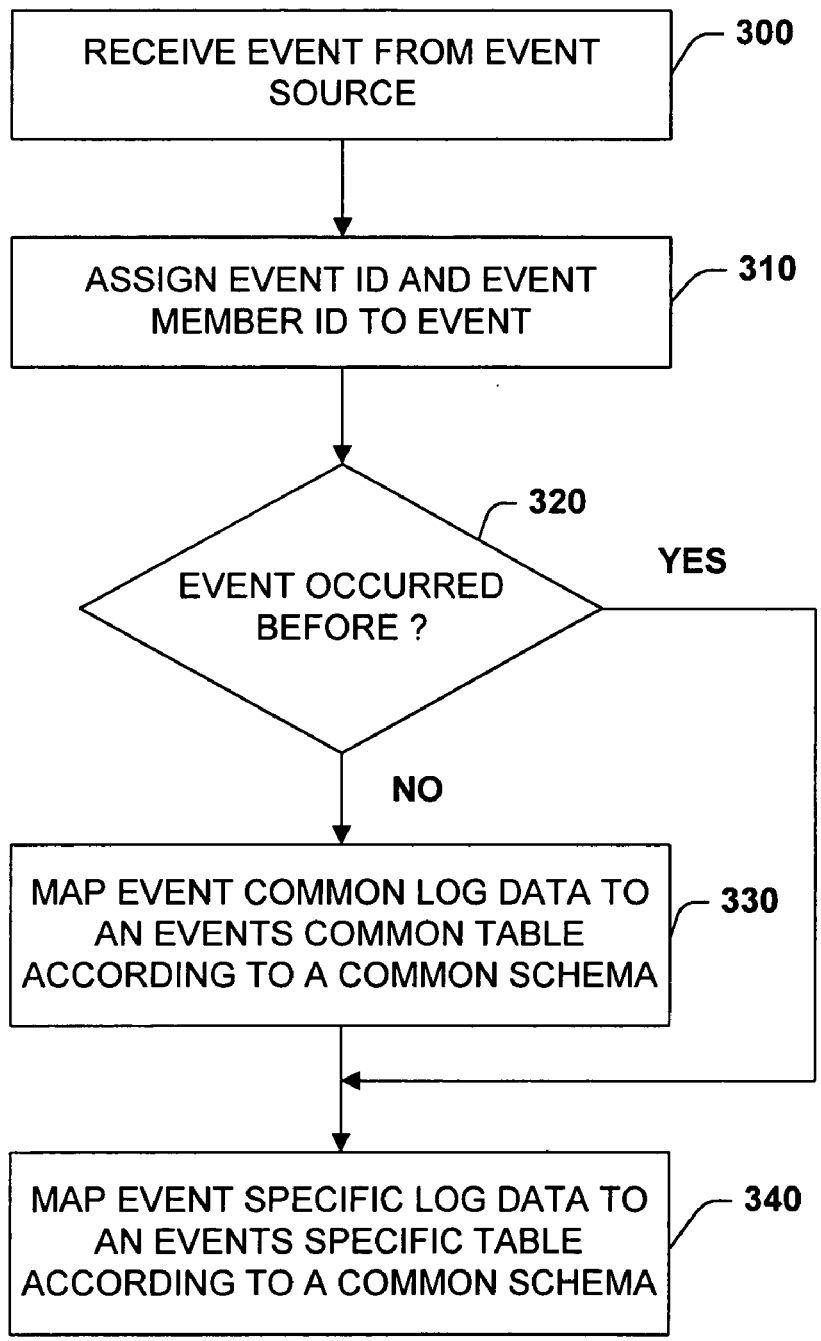
FIG. 8a is a flow diagram illustrating mapping of an event into a common schema in accordance with one aspect of the present invention.

FIG. 8a illustrates one particular methodology for logging different event types to a data store. In step 300, the event monitor system 104 receives an event from the event source 112. In step 310, an event Id and a member Id is assigned to the event. The event monitor system 104 determines whether the event has occurred before in step 320. If the event has not occurred before (NO), the event monitor system 104 maps event common log data to the events common table 140 according to a common schema. The event monitor system 104 then proceeds to step 340 and maps the event specific data of the instance or occurrence to the events specific table 142 according to a common schema. Referring again to step 320, if the event monitor system 104 determines that the event has occurred before (YES), the event monitor system 104 skips step 330 and proceeds to step 340 and maps the event specific data of the instance or occurrence to the events specific table 142 according to a common schema.

Figure 8B:
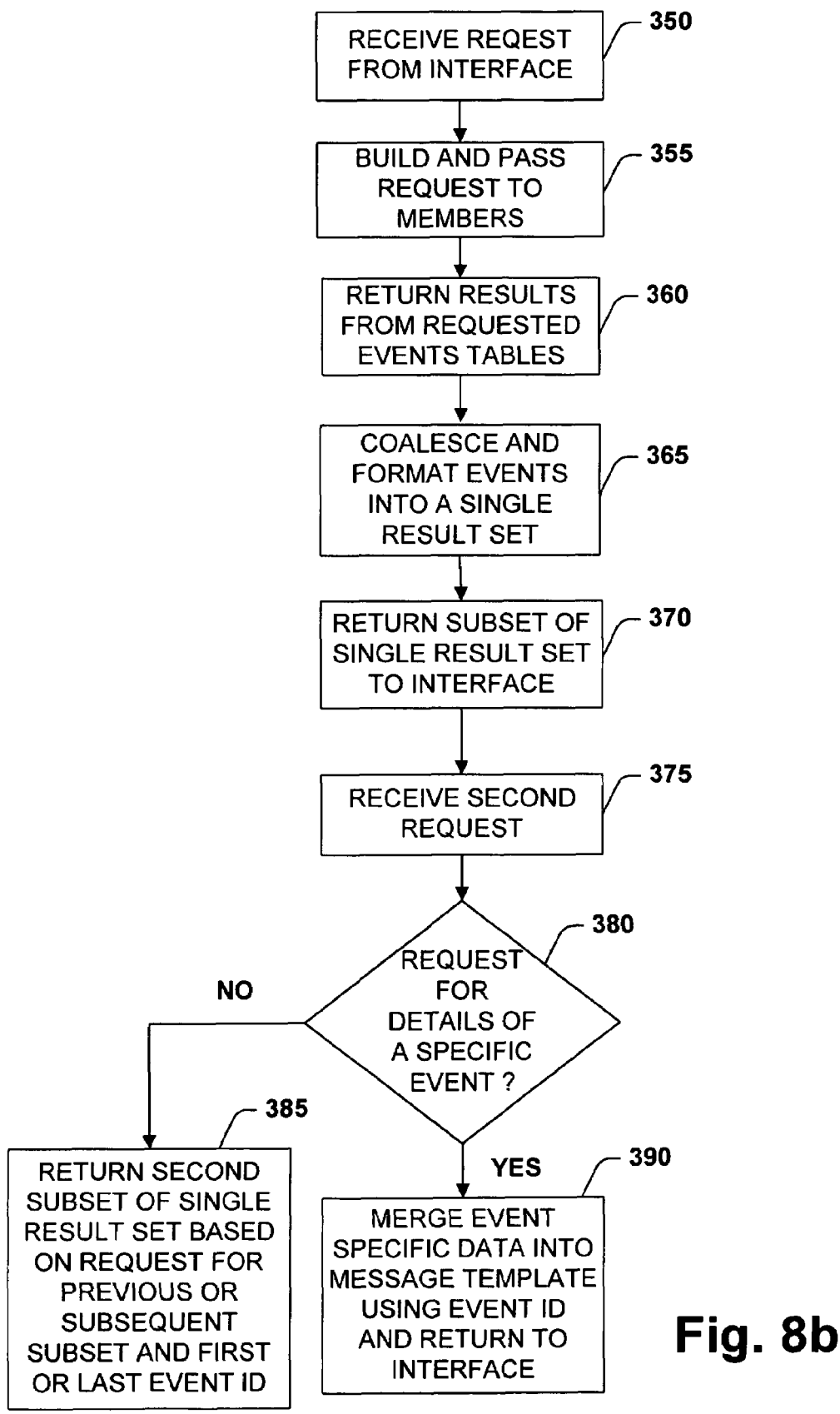
FIG. 8b is a flow diagram illustrating event coalescing and event retrieving in accordance with one aspect of the present invention.

FIG. 8b illustrates one particular methodology for requesting, retrieving and returning event data from the data stores 102. In step 350, the event gathering and coalescing system 94 receives a request from the interface 92 for event data. The request can include a request for specific event severity types and/or specific event types. In step 355, the event gathering and coalescing system 94 builds and passes the request to the respective members 100. The request can be via a query component 99 or alternatively, the query component 99 can be built into the event gathering and coalescing system 94. The results are returned from the requested event tables in the data stores 102 of the responding members 100 in step 360. In step 365, the event gathering and coalescing system 94 coalesces and formats the event data into a single result set in, for example, time descending order. In step 370, the aggregation event gathering and coalescing system 94, returns a subset of the single result set to the interface 92. In step 375, the event gathering and coalescing system 94 receives a second request for event data. The event gathering and coalescing system 94 determines if the request is for details of a specific event or for an additional subset of the single result set. If the second request is for an additional subset of the single result set (NO), the event gathering and coalescing system 94 returns a second subset of the single result set based on the request for either a previous or subsequent subset and the first or last event ID, respectively, in step 385. If the second request is for details of a specific event (YES), the event gathering and coalescing system 94 merges event specific data into a message template using the event ID and returns the message template with the event details to the interface in step 390.

Figure 9:
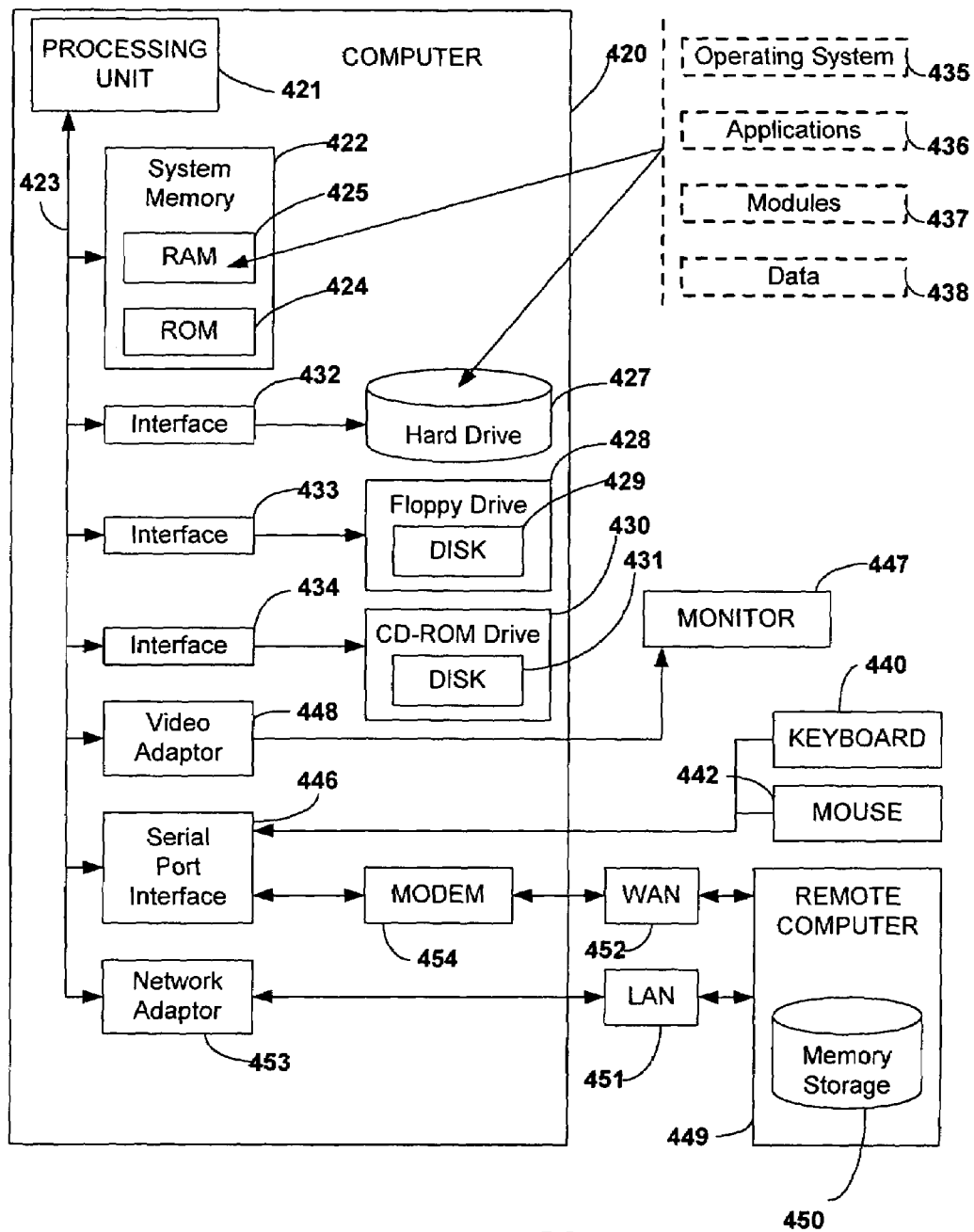
FIG. 9 illustrates a block diagram of a system in accordance with an environment of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary system for implementing the various aspects of the invention includes a conventional computer 420, including a processing unit 421, a system memory 422, and a system bus 423 that couples various system components including the system memory to the processing unit 421. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the server computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 425, including an operating system 435, one or more application programs 436, other program modules 437, and program data 438. The operating system 435 in the illustrated computer may be a Microsoft operating system (e.g., Windows NT operating system). It is to be appreciated that other operating systems may be employed such as UNIX for example.

A user may enter commands and information into the server computer 420 through a keyboard 440 and a pointing device, such as a mouse 442. Other input devices (not shown) may include a microphone, a joystick, a game pad, a satellite dish, a scanner, or the like. These and other input devices are often connected to the processing unit 421 through a serial port interface 446 that is coupled to the system bus, but may be connected by other interfaces, such as a parallel port, a game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote client computer 449. The remote computer 449 may be a workstation, a server computer, a router, a peer device or other common network node, and typically includes many or all of the elements described relative to the server computer 420, although only a memory storage device 450 is illustrated in FIG. 9. The logical connections depicted in FIG. 9 include a local area network (LAN) 451 and a wide area network (WAN) 452. Such networking environments are commonplace in offices, enterprise-wide computer networks, intranets and the Internet.

When employed in a LAN networking environment, the server computer 420 may be connected to the local network 451 through a network interface or adapter 453. When utilized in a WAN networking environment, the server computer 420 generally may include a modem 454, and/or is connected to a communications server on the LAN, and/or has other means for establishing communications over the wide area network 452, such as the Internet. The modem 454, which may be internal or external, may be connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 420, unless otherwise indicated. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for monitoring events of a plurality of members configured as an entity, comprising:
   at least one member of the entity having configurable event logging settings for determining at least one of event types to be monitored; and
   each of the plurality of members of the entity having member specific configuration settings wherein selection of event types in the at least one member is propagated to the member specific configuration settings of each of the plurality of members, and changes to the configurable event logging settings at the at least one member are dynamically updated at the member specific configuration settings of the plurality of remaining members.

2. The system of claim 1, the at least one of the plurality of members has an event monitor system operable to log event data information based on the member specific configuration settings.

3. The system of claim 2, the event monitor system comprising an event consumer component operable to determine settings in the member specific configuration settings and log at least one of an event source, an event type and an event severity type based on the settings.

4. The system of claim 3, the event consumer component being notified of changes in the member specific configuration settings and being operable to access these changes through an event source.

5. The system of claim 2, the event monitor system further comprising an event mapping component adapted to map different event types into a common data format for logging in a data store.

6. The system of claim 1, the at least one member having configurable event logging settings for determining event severity types to be monitored.

7. The system of claim 1, each event is assigned a unique event identification number, a member identification number and an event time when being logged in a data store.

8. The system of claim 7, the event data common to all event types is logged in a first table and event data specific to the event instance is logged in a second table.

9. A system for monitoring events on a member, comprising:
   an event monitor system adapted to receive different event types from an event source and log the different event types into a data store, the event data common to event types is logged in a first table and event data unique to an event type instance being logged is logged in a second table,
   the event monitor system filter comprising an event mapping component adapted to map data fields of the different event types into common data fields such that the different event types conform to a common event type schema in the data store.

10. The system of claim 9, the event monitor system further comprising an event consumer component operable to determine settings in a member specific configuration settings and log at least one of an event source, an event type and an event severity type based on the settings.

11. The system of claim 9, each event is assigned a unique event identification number, a member identification number and an event time when being logged in the data store.

12. The system of claim 9, the event types comprising at least one of operating system events, entity events and health monitor events.

13. The system of claim 9, the event monitor system being operable log event common data and event data specific to the instance of the event upon receipt of a new event and logging only event data specific to the instance of the event upon receipt of a reoccurrence of an event.

14. A system for monitoring events of a plurality of members configured as an entity, each member comprising:
   all event monitor system adapted to receive different event types from an event source and log the different event types into a data store, the event data common to event types is logged in a first table and event data unique to an event type instance being logged is logged in a second table,
   the event monitor system further comprising an event mapping component adapted to map data fields of the different event types into common data fields such that the different event types conform to a common event type schema in the data store.

15. A method for monitoring events of a plurality of members configured as an entity, comprising:
   setting configurable event logging settings at any of the plurality of members for determining one of event types to be monitored and event types not to be monitored;
   dynamically propagating the selection of event logging settings to the plurality of members of the entity to establish event logging configuration settings at the plurality of members; and
   dynamically updating the logging of event types at each of the plurality of members based on any changes in event logging settings at any of the plurality of members.

16. The method of claim 15, the act of setting configurable event logging settings at any of the plurality of members further comprising setting configurable event logging settings for determining an event severity type to be logged.

17. A method for monitoring events of a plurality of members configured as an entity, comprising:
   receiving different event types having different data fields from an event source;
   mapping the data fields of different event types to common data fields such that each event type conforms to a common schema;
   logging the mapped event types to a data store; and
   logging the event data common to event types in a first table and event data unique to an event type in a second table.

18. A system for monitoring events of a plurality of members configured as an entity, comprising:
   means for configuring event log settings at a first member of the entity for determining event types to be monitored;
   means for propagating the selection of event log settings to the plurality of members of the entity to establish event log configuration settings at the plurality of members; and means for dynamically updating the logging of event types at each of the plurality of members based on any changes in the event log settings at the first member.

19. The system of claim 18, further comprising means for logging different event types into a common format at each of the plurality of members.

20. A system for monitoring events of a plurality of members configured as an entity, comprising:

means for receiving different event types having different data fields from an event source;

means for logging event data common to event types in a first table and event data unique to an event type instance being logged in a second table, means for mapping the data fields of different event types to common data fields such that each event type conforms to a common schema; and means for logging the mapped event type to a data store.

21. The system of claim 20, further comprising means for merging event data specific to an event occurrence into event data common to the event.

* * * * *